United States Patent [19]

Ondrasik

[11] Patent Number: 5,158,311
[45] Date of Patent: Oct. 27, 1992

[54] SHOPPING CART WITH SECURITY INDICIA

[76] Inventor: V. John Ondrasik, 17044 Westbury Dr., Granada Hills, Calif. 91344

[21] Appl. No.: 818,078

[22] Filed: Jan. 8, 1992

[51] Int. Cl.$^5$ .............................................. B62D 39/00
[52] U.S. Cl. ................................. 280/33.992; 40/308
[58] Field of Search ...................... 280/33.991, 33.992, 280/33.993, 33.994; 40/308, 625, 912, 913; 224/277

[56] References Cited

U.S. PATENT DOCUMENTS

| | | | |
|---|---|---|---|
| 2,918,741 | 12/1959 | Welter et al. | 280/33.992 X |
| 3,270,454 | 9/1966 | Lachance | 40/308 |
| 3,402,497 | 9/1968 | Swain | 40/308 |
| 3,418,739 | 12/1968 | Buczak | 40/308 |
| 5,020,811 | 6/1991 | Ohdrasik | 280/33.993 |
| 5,106,111 | 4/1992 | Ohdrasik | 280/33.991 |

Primary Examiner—Charles A. Marmor
Assistant Examiner—Michael Mar
Attorney, Agent, or Firm—Brown, Martin, Haller & McClain

[57] ABSTRACT

A shopping cart has a wheeled frame and a basket secured to the frame for carrying groceries or other items to be purchased. A pair of reinforcing rails runs along the top of the basket, the rails being welded on the respective inner and outer sides of the side and front end walls to leave a small gap between the rails. At least one of the rails has identifying or security indicia stamped at spaced intervals along its length on its innermost face which faces the opposing rail. The small gap between the rails makes it very difficult to remove or obliterate the indicia without dismantling the rails from the cart.

4 Claims, 1 Drawing Sheet

SHOPPING CART WITH SECURITY INDICIA

BACKGROUND OF THE INVENTION

The present invention relates generally to wheeled shopping carts of the type used by customers in grocery and other large stores to collect items to be purchased and to transport the purchased items to an automobile.

Such carts are typically relatively expensive items, and grocery and other stores lose a fairly large amount of money annually due to theft of such carts from parking lots. Most stores imprint identifying indicia on the cart, typically on the handle. However, such indicia are relatively easy to remove from stolen carts with a grinding tool or the like, allowing the carts to be re-sold or used without risk of identification of the legal owner of the cart.

SUMMARY OF THE INVENTION

It is an object of the present invention to provide a new and improved technique for applying identifying indicia to a shopping cart, and an improved shopping cart in which the source identifying indicia are difficult or impossible to remove.

According to one aspect of the present invention a shopping cart is provided, which comprises a wheeled frame, a basket mounted on the frame for carrying groceries or other items, the basket having a lower wall and spaced side, front and rear walls defining a container with an open upper end, each of the walls being of mesh or grille constructions comprising spaced horizontal and vertical crossbars, and including a pair of spaced reinforcing rails running around at least one of the upper and lower ends of the side and front walls of the basket and secured to the respective inner and outer sides of the respective walls at their upper or lower ends, at least one of the rails having identifying indicia stamped into its innermost face which faces towards the other rail, the spacing between the opposing rails being approximately equal to the basket wall thickness.

With this arrangement, it is impossible to remove the identifying indicia with a grinding tool since the gap between the rails is insufficient for access of the tool to the stamped indicia. Thus, the only way to obliterate the identifying indicia would be to take the cart apart, which would probably result in damage beyond repair. This will ensure that identifying indicia cannot be easily removed from stolen carts, and recovered carts can therefore be returned to their rightful owner.

The identifying indicia may be stamped at regular intervals along the length of each of the reinforcing rails, and the rails welded to the uppermost ends of the side and front walls of the cart with their stamped faces directed inwardly towards one another. Where the cart has a pair of reinforcing rails running around the periphery of both the upper and lower end of the basket, the indicia may be provided on both sets of rails, making successful removal or obliteration more or less impossible. The appropriate indicia will be stamped onto the reinforcing rails prior to assembly of the cart, and the rails will then be suitably bent to encompass the upper and/or lower end of the basket with the indicia facing inwardly on the outermost rail and outwardly on the innermost rail of the pair.

BRIEF DESCRIPTION OF THE DRAWINGS

The present invention will be better understood from the following detailed description of a preferred embodiment, taken in conjunction with the accompanying drawings, in which like reference numerals refer to like parts, and in which.

DESCRIPTION OF THE PREFERRED EMBODIMENT

Figure 1:
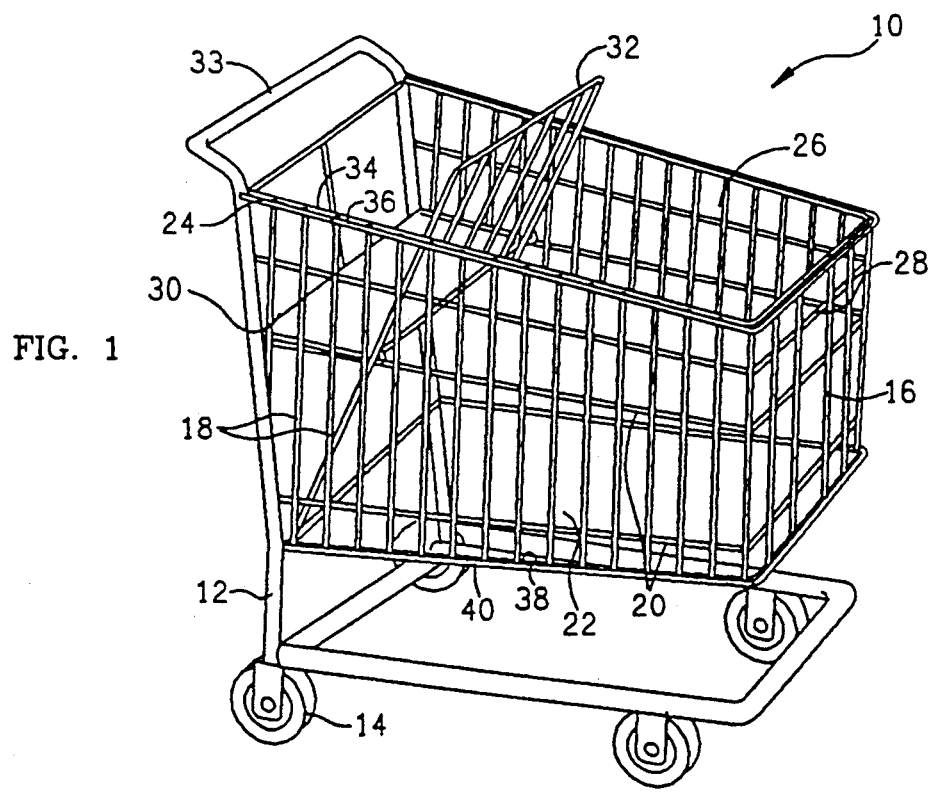
FIG. 1 is a perspective view of a wheeled shopping cart.

The drawings illustrate a shopping cart 10 for use in grocery or other large stores and provided with security indicia according to a preferred embodiment of the present invention. The cart 10 basically comprises a frame 12 with wheels 14, and a basket 16 mounted on the frame for carrying groceries or other items. The basket 16 is of metal grille construction, the grille comprising spaced vertical and horizontal cross bars or wires 18, 20, and has a lower wall 22, spaced side walls 24, 26, and spaced front and rear walls 28, 30. The rear wall 30 may be in the form of a pivoted gate to which a child's seat structure 32 is collapsibly mounted, as is commonly used in shopping carts to permit stacking of the carts to conserve space. A suitable handle 33 is formed on the frame for pushing the cart.

Figure 2:
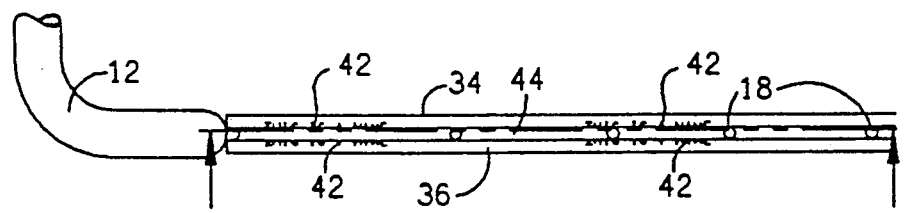
FIG. 2 is a top plan view along lines 2—2 of FIG. 1 of part of the cart provided with identifying indicia according to a preferred embodiment of the present invention.

A pair of spaced reinforcing bars or rails 34, 36 runs around the open upper end of the basket 16, the bars being suitably welded to the upper ends of the vertical wires 18 of the side and front end walls on the inner and outer sides of the wires, as best illustrated in FIG. 2, and as described in more detail in my co-pending application Ser. No. 07/372,238 filed Jun. 1989. A similar pair of spaced reinforcing bars 38, 40 is preferably welded at the lower ends of the vertical wires or rods 18 on the inner and outer sides of the basket, respectively, as illustrated in FIG. 1.

Figure 3:
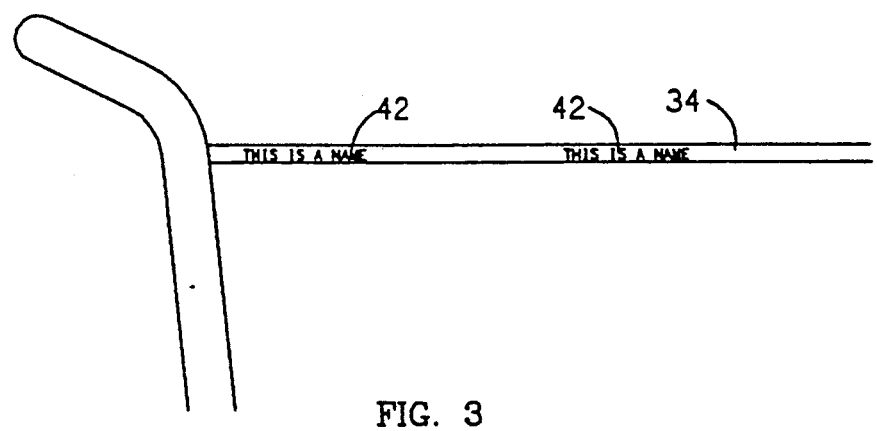
FIG. 3 is a view along the lines 3—3 of FIG. 2.

The cart 10 is provided with security or identifying indicia or markings 42 which are stamped into the inner face of at least one of the reinforcing bars 34, 36, 38, 40, as illustrated in FIGS. 2 and 3. The indicia 42 may comprise the name of the store, for example. Preferably, the selected indicia are stamped at regular intervals along the length of each of the reinforcing bars prior to assembly of the cart, and the bars are then welded in place with the indicia facing inwardly, as illustrated in FIG. 2.

With this arrangement, it is impossible to obliterate or remove the identifying indicia from the cart without taking it apart, since the gap 44 between the opposing faces of the reinforcing rails is insufficient to allow access of a grinding tool or the like to remove the indicia. The only possible way to remove the indicia successfully would be to remove the reinforcing rails from the cart, which would probably result in damaging the cart beyond repair. Thus, the identifying indicia on stolen carts cannot easily be removed, and the legal owner can be identified if any attempt is made to re-sell the cart or use it for other purposes. It is likely that such identifying indicia will provide a significant deterrent to shopping cart theft, and may result in a reduction of the number of carts lost in this way.

Although a preferred embodiment of the invention has been described above by way of example only, it will be understood by those skilled in the field that modifications may be made to the disclosed embodiment without departing from the scope of the invention, which is defined by the appended claims.

I claim:

1. A shopping cart, comprising:

a wheeled frame;

a basket of metal grille construction mounted on the frame;

the basket having a lower wall, spaced side walls, and spaced front and rear walls, the side walls and the front and rear walls having upper and lower ends, the lower ends being joined to the lower wall to define a container with an open upper end, each wall comprising a series of spaced vertical and horizontal cross bars;

a pair of laterally spaced reinforcing rails running around at least part of the periphery of at least one of the upper and lower ends of the side and front walls, the pair of rails having opposing innermost surfaces which are rigidly secured along respective inner and outer sides of the respective walls, the spacing between said pair of rails being approximately equal to the thickness of the walls; and a first one of said pair of reinforcing rails having identifying security indicia stamped on its innermost surface in opposing relation to the innermost surface on said other rail.

2. The shopping cart as claimed in claim 1, wherein said identifying indicia are stamped at spaced intervals along the length of the reinforcing rail.

3. The shopping cart as claimed in claim 1, wherein the other reinforcing rail has identical identifying indicia to the first rail stamped on its inner face which faces said first rail.

4. The shopping cart as claimed in claim 1, wherein spaced upper and lower pairs of reinforcing rails are secured along the respective inner and outer faces of the side and front walls at the upper and lower ends of said walls, and identifying indicia are stamped at spaced intervals on each of the reinforcing rails on the innermost face of each rail which faces the other rail of each pair.

* * * * *